T. J. FULLER.
PLANTER.
APPLICATION FILED FEB. 13, 1909.
950,019.
Patented Feb. 22, 1910.
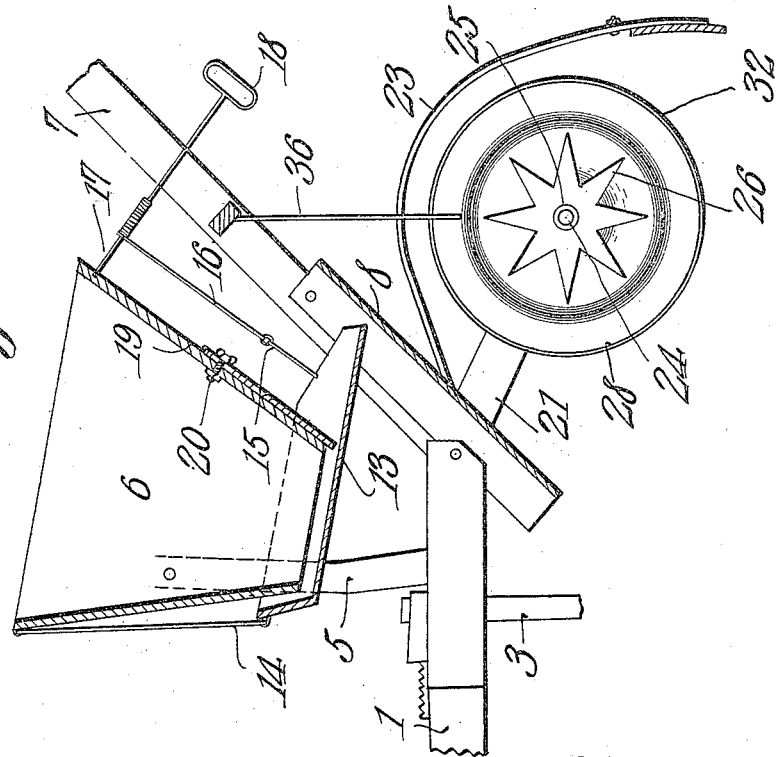
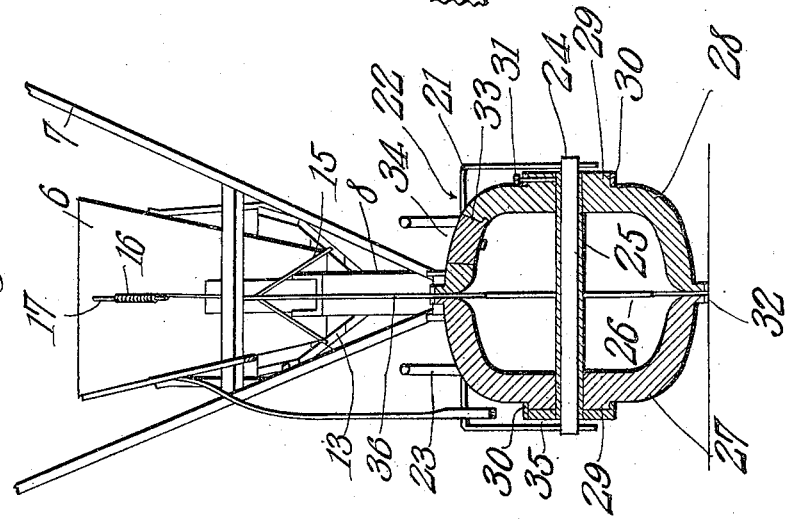
Witnesses
Inventor
Thomas J. Fuller.
By C. A. Snow & Co.
Attorneys

UNITED STATES PATENT OFFICE.

THOMAS J. FULLER, OF McRAE, GEORGIA.

PLANTER.

950,019.   Specification of Letters Patent.   Patented Feb. 22, 1910.

Application filed February 13, 1909. Serial No. 477,643.

*To all whom it may concern:*

Be it known that I, THOMAS J. FULLER, a citizen of the United States, residing at McRae, in the county of Telfair and State of Georgia, have invented a new and useful Planter, of which the following is a specification.

This invention has relation to planters, and it consists in the novel arrangement and construction of its parts, as hereinafter shown and described.

The object of the invention is to provide an implement as indicated with a rotating receptacle, which is adapted to serve as a furrow compactor and a seed depositor. The said receptacle is of peculiar configuration, and the parts thereof are so assembled that the quantity of the material dropped may be regulated to a nicety.

Figure 1 is a sectional view of portions of the planter. Fig. 2 is a transverse sectional view of portions of the same.

The planter consists of a beam 1. The arms 5 (of which but one is shown in Fig. 1) are mounted upon the rear end portion of the beam 1, and the forward end portion of the hopper 6 is pivotally mounted between the upper end portions of the said arms 5. The handles 7 are attached, at their lower ends, to the rear end of the beam 1, and the chute 8 is located between the lower portions of the handles and extends down behind the rear end of the beam 1. Any suitable means (not shown) may be provided for rocking the hopper.

The tray 13 is held in suspended position below the lower end of the hopper 6. The forward end portion of the said tray is supported by means of a cable 14, which is attached, at its upper end, to the upper portion of the hopper 6, and at its lower end to the upper forward edge of the said tray 13. The flexible member 15 is attached at its ends to the side portions of the rear ends of the tray 13, and the lower end of the cable 16 is connected with the said member 15, and the upper portion of the said cable winds upon the shaft 17, which is journaled for rotation at the rear side of the hopper 6, and which is provided with a handle end 18. The rear end of the discharge end of the said tray 13 is disposed over the upper end portion of the chute 8. The hopper 6 is provided, at its rear side, with a sliding valve 19, which is adapted to be secured in an adjusted position by means of a set screw and nut 20, which passes transversely through the rear side of the said hopper 6, and also transversely through the said valve 19.

The arms 21 are attached at their forward end portions to the rear portions of the sides of the beam 1, and extend rearwardly and downwardly with relation to the said beam. The said arms are provided at intermediate points with the laterally disposed sections or portions 22. The forward ends of the spring fingers 23 are attached to the laterally disposed portions 22 of the arms 21, and are upwardly bowed and extend rearwardly behind the ends of the said arms 21. The rear ends of the said fingers 23 may be provided with covering plows or a cover board, as desired.

The shaft 24 is journaled for rotation between the rear end portions of the arms 21, and the sleeve 25 is mounted upon the intermediate portion of the said shaft 24. The stelliform member 26 is mounted upon the intermediate portion of the sleeve 25.

The seed receptacle consists of the substantially hemispherical members 27 and 28; each of the said members is provided at its center with a laterally disposed hub 29, which is bored to fit snugly about the sleeve 25 mounted upon the axle 24, and each of which is bounded by a peripheral ring 30. Set screws 31 (but one of which is shown) pass transversely through each of said rings 30, and the hubs of the said members 27 and 28, and are adapted to bear, at their inner ends, against the sleeve 25, mounted upon the shaft 24. Thus means is provided for fixing the members 27 and 28 with respect to the axle 24, and also by loosening the said setscrews, the said members may be shifted along the sleeve 25, so that the space between the said members may be increased or diminished, as desired. Each of the members 27 and 28 is provided, at its inner portion, or portion of greatest diameter, with the tread 32. The said treads are continuous and annular, and are substantially cylindrical. The peripheral surfaces of the said treads 32 are located beyond the general contour of the body portions of the members 27 and 28, the object of which will be hereinafter explained. The member 28 is provided in its side with an opening 33, which is normally closed by a detachable plate 34. It is through the said opening 33 that access to the interior of the receptacle of which the members 27 and 28 form a component part, is had, for the purpose of placing seed in the said receptacle. The member 27 is provided upon its hub 29 with a stelliform wheel 35 and the lower hooked end 10 of the arm 9 normally lies in the path of movement of the points of the said wheel 35.

The planter operates as follows:—As the implement is drawn along the surface of the soil, the seed receptacle, of which the members 27 and 28 form the component parts, rotates. At the same time, the treads 32 of the said members project down into the soil and form a depression therein. The seed which is contained within the said receptacle passes out through the space between the members 27 and 28 and is deposited in the said depression made by the treads 32 of the said receptacle members. The stelliform wheel 26 carried by the sleeve 25 prevents the seed from falling or packing in the said receptacle. After the seed has been deposited in the depression, as above described, it is covered by the furrow-covering members carried by the fingers 23. The finger 36 is attached to a cross bar between the handles 7 and enters the space between the members 27 and 28 and is adapted to keep the same free of dirt and stones.

Having described my invention, what I claim as new, and desire to secure, by Letters Patent, is:—

In a planter, a shaft, a sleeve journaled upon the shaft, spaced approximately hemispherical members adjustably fixed at their hubs to the end portions of the sleeve and a stelliform seed stirrer fixed to the sleeve and lying in a plane passing through the space between the inner ends of the said members.

In testimony that I claim the foregoing as my own, I have hereto affixed my signature in the presence of two witnesses.

THOMAS J. FULLER.

Witnesses:
D. O. KELLY,
R. T. LESLIE.